UNITED STATES PATENT OFFICE.

THOMAS ABNEY NAPIER LEADBETTER, OF HALE, ANDREW LAWSON KNOX GILCHRIST, OF LYTHAM, AND WILLIAM HENRY TATE, OF BROOKLANDS, ENGLAND.

INTERNAL-COMBUSTION ENGINE.

1,301,141.           Specification of Letters Patent.      Patented Apr. 22, 1919.

Application filed September 18, 1917. Serial No. 191,933.

*To all whom it may concern:*

Be it known that we, THOMAS ABNEY NAPIER LEADBETTER, ANDREW LAWSON KNOX GILCHRIST, and WILLIAM HENRY TATE, subjects of the King of Great Britain, and residents of Hale, Cheshire, England, Lytham, England, and Brooklands, Cheshire, England, respectively, have invented certain new and useful Improvements in or Relating to Internal Combustion Engines, of which the following is a specification.

This invention relates to improvements in internal combustion engines acting on the Otto or four stroke cycle, and comprises certain constructional features and arrangements of the engine whereby a greater flexibility and reduced fuel consumption may be obtained as compared with existing types. Further advantages of the invention lie in the fact that the improved engine may be more economically manufactured and is more reliable owing to the simple disposition of the parts and valve gear, while the space occupied for the same horse-power and number of revolutions as compared with other engines is considerably less.

According to this invention, each engine unit comprises twin cylinders communicating at the top or head in an explosion chamber common to both cylinders. The inlet and exhaust of the gases is controlled by means of sleeve valves mounted between the pistons and the cylinders and operated either by a reciprocating or rotary movement, such movement being effected by means of links and disk cranks, chains, or eccentrics, from an auxiliary shaft driven from the crank shaft. The twin pistons of each unit are coupled up to a crank pin common to both pistons. The engine may be arranged in any suitable form either in V-pattern having two units working on a common crank pin, or a series of engine units may be arranged in radial form working on a crank pin common to a series of units.

Figure 1:
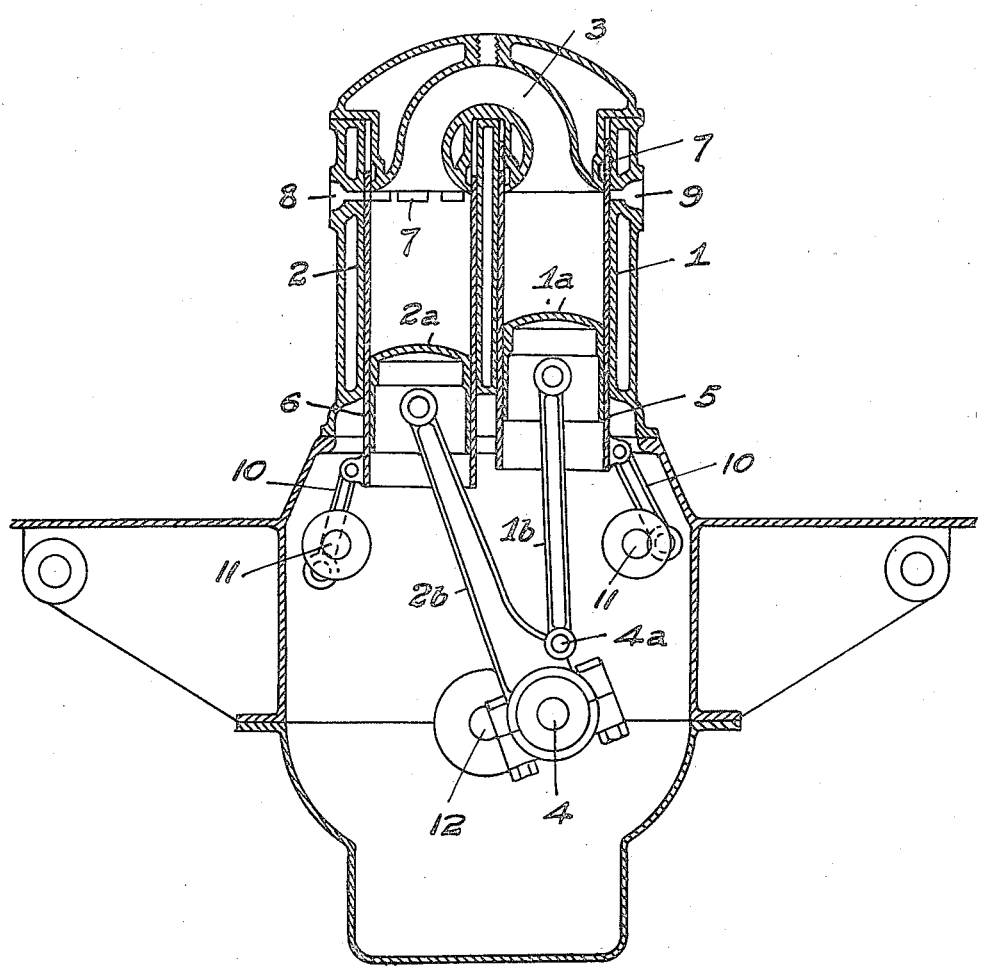
Figure 2:
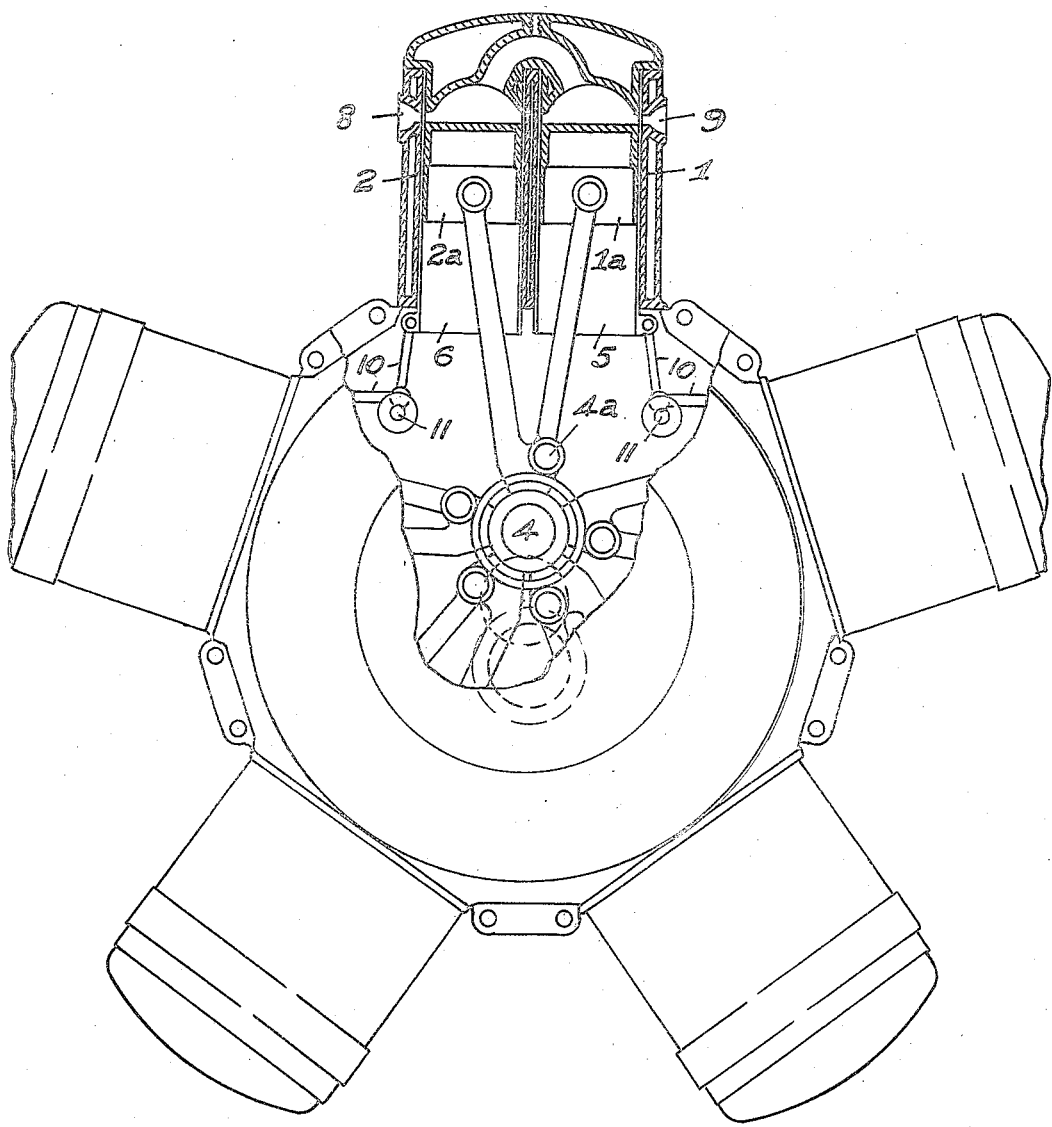

An engine in accordance with this invention is illustrated in the accompanying drawings, in which Figure 1 is a vertical section through an engine unit having twin cylinders, the gases being controlled by sleeve valves. Fig. 2 is a diagrammatic view showing a series of duplex engine units arranged in radial form operating on a single crank pin.

As illustrated in Fig. 1, the twin cylinders 1, 2, open into a common combustion chamber 3, the pistons $1^a$, $2^a$, being connected respectively by rods $1^b$, $2^b$ to the crank pin 4, and a knuckle $4^a$ on the connecting rod $2^b$ of the other piston. The inlet and exhaust for the fuel charge and spent gas into and from the combustion chamber 3 are controlled by sleeves 5, 6, sliding in the cylinders 1, 2, the pistons $1^a$, $2^a$, reciprocating within the sleeves. Ports 7 in each sleeve are adapted as the latter reciprocates to uncover the inlet and exhaust ports 8, 9, and thus control the fuel charge and exhaust gases. The sleeves are reciprocated by links 10 driven from auxiliary shafts 11, operated in any suitable manner from the main crank shaft 12, the movement of the sleeves being timed as required.

As shown in the diagrammatic view, Fig. 2, the pistons working in the cylinders are connected by rods to a crank pin common to all the engine units, one of the connecting rods of each engine unit being pivoted direct on the crank pin 4, and the other connecting rod being pivoted to a knuckle or lug $4^a$ on the other connecting rod near the crank pin.

In operation, the engine follows the usual four stroke cycle, a charge being taken into the combustion chamber and cylinders by the outgoing pistons through the inlet 8 when the latter is uncovered by the ports 7 in the sleeve 6, the charge being then compressed and fired in any suitable manner. Owing to the expansion of the exploded mixture taking place in the two cylinders of the engine unit, and acting on two pistons, the consumption of fuel is less than with other types of engine, in which the combustion chamber is merely an extension of one cylinder.

An engine of the type described may be made of an extremely light, yet strong and serviceable, construction and in consequence is particularly suitable for aeroplane work, though the same principle of construction may be applied for all classes of motor vehicles and marine engines or to stationary engines.

By providing separate valves for the inlet and exhaust, leakage is prevented of the gases passing direct from the inlet to the exhaust and vice versa, while owing to the large area possible for the valve ports a higher engine speed may be obtained due to the greater possible speed of the gases. Further owing to the large port openings possible and the low terminal pressure due to the duplex arrangement of the cylinders, the port edges are not liable to cut away. A further advantage of the duplex sleeve valve for each unit lies in the fact that the setting of the exhaust valve may be altered without interfering with the setting of the inlet valve. Additional exhaust ports may be provided for aero work and racing engines.

By fitting blocks of four cylinders around the circumference of the crank case, a two-throw crankshaft may be arranged, which results in an engine being obtained which is balanced both in running and firing, and obviates the necessity for using balance weights.

We claim.

1. An internal combustion engine operating on the four stroke cycle in which the engine unit comprises twin cylinders, a single explosion chamber common to and communicating with both cylinders, twin pistons mounted to reciprocate in the cylinders and connected with a crank pin common to both pistons, inlet and exhaust ports for the gases, and a sleeve valve working between each of said cylinders and its piston, said valves operating one to control said inlet ports and the other to control said exhaust ports.

2. An internal combustion engine operating on the four stroke cycle in which the engine unit comprises twin cylinders, a single explosion chamber common to and communicating with both cylinders, twin pistons mounted to reciprocate in the cylinders and connected with a crank pin common to both pistons, an inlet port communicating with the explosion chamber through one of said cylinders, an exhaust port communicating with the explosion chamber through the other of said cylinders, and a sleeve valve working between each of said cylinders and its piston, said valves operating respectively to control said inlet and exhaust ports.

3. An internal combustion engine operating on the four stroke cycle in which the engine unit comprises, twin cylinders communicating at the head in an explosion chamber common to both cylinders; twin pistons reciprocating in the cylinders and connected to a crank pin common to both pistons; a single inlet and a single exhaust port to the common explosion chamber, and sleeve valves controlling the inlet and exhaust ports and working between the pistons and the cylinders.

In testimony whereof we affix our signatures in presence of two witnesses.

THOMAS ABNEY NAPIER LEADBETTER.
ANDREW LAWSON KNOX GILCHRIST.
WILLIAM HENRY TATE.

Witnesses:
EWALD SIMPSON MOSELEY,
GEORGE WEAVER.